(12) United States Patent
Lyons et al.

(10) Patent No.: US 6,330,286 B1
(45) Date of Patent: Dec. 11, 2001

(54) FLOW CONTROL, LATENCY CONTROL, AND BITRATE CONVERSIONS IN A TIMING CORRECTION AND FRAME SYNCHRONIZATION APPARATUS

(75) Inventors: Paul Wallace Lyons, New Egypt; John Prickett Beltz, Willingboro, both of NJ (US); Alfonse Anthony Acampora, Staten Island, NY (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/589,775

(22) Filed: Jun. 8, 2000

Related U.S. Application Data
(60) Provisional application No. 60/138,223, filed on Jun. 19, 1999.

(51) Int. Cl.[7] ............................................. H04N 7/12
(52) U.S. Cl. .............................. 375/240.28; 375/240.26
(58) Field of Search ...................................... ; H04N 7/12

(56) References Cited

U.S. PATENT DOCUMENTS

| | | | | |
|---|---|---|---|---|
| 5,280,479 | * | 1/1994 | Mary | 370/85.6 |
| 5,371,547 | * | 12/1994 | Siracusa et al. | 348/426 |
| 5,534,944 | * | 7/1996 | Egawa et al. | 348/584 |
| 5,596,581 | * | 1/1997 | Saeijs et al. | 370/394 |
| 5,602,592 | * | 2/1997 | Mori et al. | 348/415 |
| 5,640,320 | * | 6/1997 | Jackson et al. | 364/192 |
| 6,034,731 | * | 3/2000 | Hurst, Jr. | 348/423 |
| 6,061,399 | * | 5/2000 | Lyons et al. | 375/240 |
| 6,111,896 | * | 8/2000 | Slattery et al. | 370/535 |
| 6,137,834 | * | 10/2000 | Wine et al. | 375/240 |
| 6,195,368 | * | 2/2001 | Gratacap | 370/535 |

FOREIGN PATENT DOCUMENTS

| | | | |
|---|---|---|---|
| 0 881 840 A2 | 12/1998 | (EP) | H04N 7/62 |
| 0 897 245 A2 | 2/1999 | (EP) | H04N 7/24 |

OTHER PUBLICATIONS

Birch, C.H., "MPEG splicing and bandwidth management", International Broadcasting Convention, Sep. 1997, pp. 541–546.*

Brightwell et al., "Flexible switching and editing of MPEG–2 video bitstreams", International Broadcasting Convention, Sep. 1997, pp. 547–552.*

Wee et al., "Splicing MPEG video streams in the compressed domain", IEEE First Workshop on Multimedia Signal Processing, Jun. 1997, pp. 225–230.*

Balakrishman et al., "Rate and buffer regulation in a video encoder for seamless splicing", ICIP 1998, vol. 1, pp. 880–883, Oct. 1998.*

Radha et al., "Compressed video seamless switching using variable splicing parameters", ICIP 1998, vol. 1, pp. 862–865, Oct. 1998.*

* cited by examiner

Primary Examiner—Vu Le
(74) Attorney, Agent, or Firm—William J. Burke

(57) ABSTRACT

In a compressed domain digital communications system, a method for reducing a variable latency associated with a buffer and at least partially resulting from at least one splice between a FROM bitstream and a TO bitstream each including data corresponding to a plurality of frames, the method including: selectively deleting data corresponding to a select at least one of the frames from the buffer based upon the variable latency so as to reduce the variable latency when an amount of data corresponding to a number of frames present in the buffer is greater than a given number of frames; and, regulating a flow of data in the system to prevent an underflow condition in the system by effecting a repeat last frame command and prevent an overflow condition in the system by slowing a rate of transmission for the data associated with at least one of the frames in the TO bitstream.

20 Claims, 3 Drawing Sheets

FLOW CONTROL, LATENCY CONTROL, AND BITRATE CONVERSIONS IN A TIMING CORRECTION AND FRAME SYNCHRONIZATION APPARATUS

RELATED APPLICATIONS

This application claims the benefit of U.S. Provisional Application No. 60/138,223, entitled "FLOW CONTROL, LATENCY CONTROL AND BITRATE CONVERSIONS IN A TIMING CORRECTION AND FRAME SYNCHRONIZATION APPARATUS", filed on Jun. 9, 1999, the entire disclosure of which is hereby incorporated by reference.

The present invention is also related to commonly assigned U.S. patent application Ser. No. 08/864,326, entitled "TIMING CORRECTION METHOD AND APPARATUS", filed May 28, 1997 (the '"326 application) and U.S. patent application Ser. No. 08/864,325, entitled "METHOD AND APPARATUS FOR INFORMATION STREAM FRAME SYNCHRONIZATION", filed May 28, 1997 (the '"325 application), now U.S. Pat. No. 6,061,399 issued on May 9, 2000, each of which are also incorporated herein by reference in their respective entireties.

GOVERNMENT INTERESTS

This invention was made with U.S. government support and funded by National Institute of Standards and Technology (NIST) under contract No. 70NANB5H1174. The U.S. government has certain rights in this invention.

BACKGROUND OF INVENTION

The referenced '325 and '326 applications cited and incorporated by reference herein address timing correction and frame synchronization in a splicer/switcher for bitstreams. The goal of splicing compressed bit streams is to change or transition from one compressed data source to a second compressed data source with minimal disruption in the decoded program, while maintaining bitstream compliance prior to, through and after the transition. Input streams are de-multiplexed to the Packetized Elementary Stream (PES) level before being processed by individual elementary stream type processors. Program video and audio are spliced at access unit (frame) boundaries, however video splicing is typically higher in priority than audio splicing which is typically dependent upon video splice timing. Lip sync between program video and audio is maintained through the splice point. A continuous flow of time stamped video and audio frames, without timing discontinuities, is maintained in the output stream.

The video splicing approach described in the referenced and incorporated '325 and '326 applications examines incoming streams to extract stream parameters that are used to determine stream entry and exit points and calculate values required by the outgoing stream. Exit points are found in the current output stream, e.g. a "FROM" stream, while entry points are found in the next output stream, e.g. a "TO" stream. Pre-selection of the TO stream from multiple possible input streams preferably limits the number of input processing circuits needed to two.

A time base correction process restamps the stream selected for output. A transport stream encoder maintains the output time base and re-multiplexes the PES streams into an Advanced Television Systems Committee (ATSC) compliant output stream. A frame synchronization feature adds or drops frames from the output stream as needed to maintain Video Buffering Verifier (VBV) buffer fullness or to reconcile differences between the input FROM and TO bitstream rates and the output stream rate. This feature provides for asynchronous inputs from remote or local sources.

Output stream flow control is provided to transition the output stream buffer levels and VBV delays to the values in the To stream. This permits the switch to replicate previously generated variable bit rate (VBR) stream data rates after a transition period from one stream to the next. It should be understood that the ability to utilize VBR streams is important to studios since they provide broadcasters with channel space, which can of course be used for opportunistic data channels that provide additional sources of revenue.

However, it has been recognized that adding and dropping frames for buffer control essentially changes the end-to-end delay, or latency, of the overall system. More particularly, when the remote clock frequency is consistently higher than the local clock frequency, the end-to-end system delay increases. When the remote clock frequency is consistently lower than the local clock frequency, the end-to-end system delay decreases. When the current value differs from the stored value for end-to-end delay by a value equal to one frame, and other external criteria are met, a frame is either dropped or added. As the buffer of the next output, e.g. corresponding to a preselected or TO stream, fills while awaiting a proper exit point in the FROM or current stream, there is the potential for this additional unpredictable change in end-to-end delay or latency. This is undesirable, and there is a need to eliminate this unpredictable and variable latency.

It is an object of the present invention to provide latency control whereby a variable latency generated by switching or transitioning between compressed data sources is reduced and systematically eliminated.

SUMMARY OF INVENTION

In a compressed domain digital communications system, a method for reducing a variable latency associated with a buffer and at least partially resulting from at least one splice between a FROM bitstream and a TO bitstream each including data corresponding to a plurality of frames, the method including: selectively deleting data corresponding to a select at least one of the frames from the buffer based upon the variable latency so as to reduce the variable latency when an amount of data corresponding to a number of frames present in the buffer is greater than a given number of frames; and, regulating a flow of data in the system to prevent an underflow condition in the system by effecting a repeat last frame command and prevent an overflow condition in the system by slowing a rate of transmission for the data associated with at least one of the frames in the TO bitstream.

BRIEF DESCRIPTION OF THE FIGURES

Various other objects, features and advantages of the invention will become more apparent by reading the following detailed description in conjunction with the drawings, which are shown by way of example only, wherein.

DETAILED DESCRIPTION OF THE INVENTION

This present invention builds upon the teachings of the referenced and incorporated '325 and '326 applications by enhancing the concept of frame synchronization by introducing latency control and further refining the concept of flow control. Bitrate conversion from constant bitrate (CBR) types of encoding to variable bitrate (VBR) encoding is also provided according to the present invention, and has great value to broadcasters and other users of the system.

Figure 1:
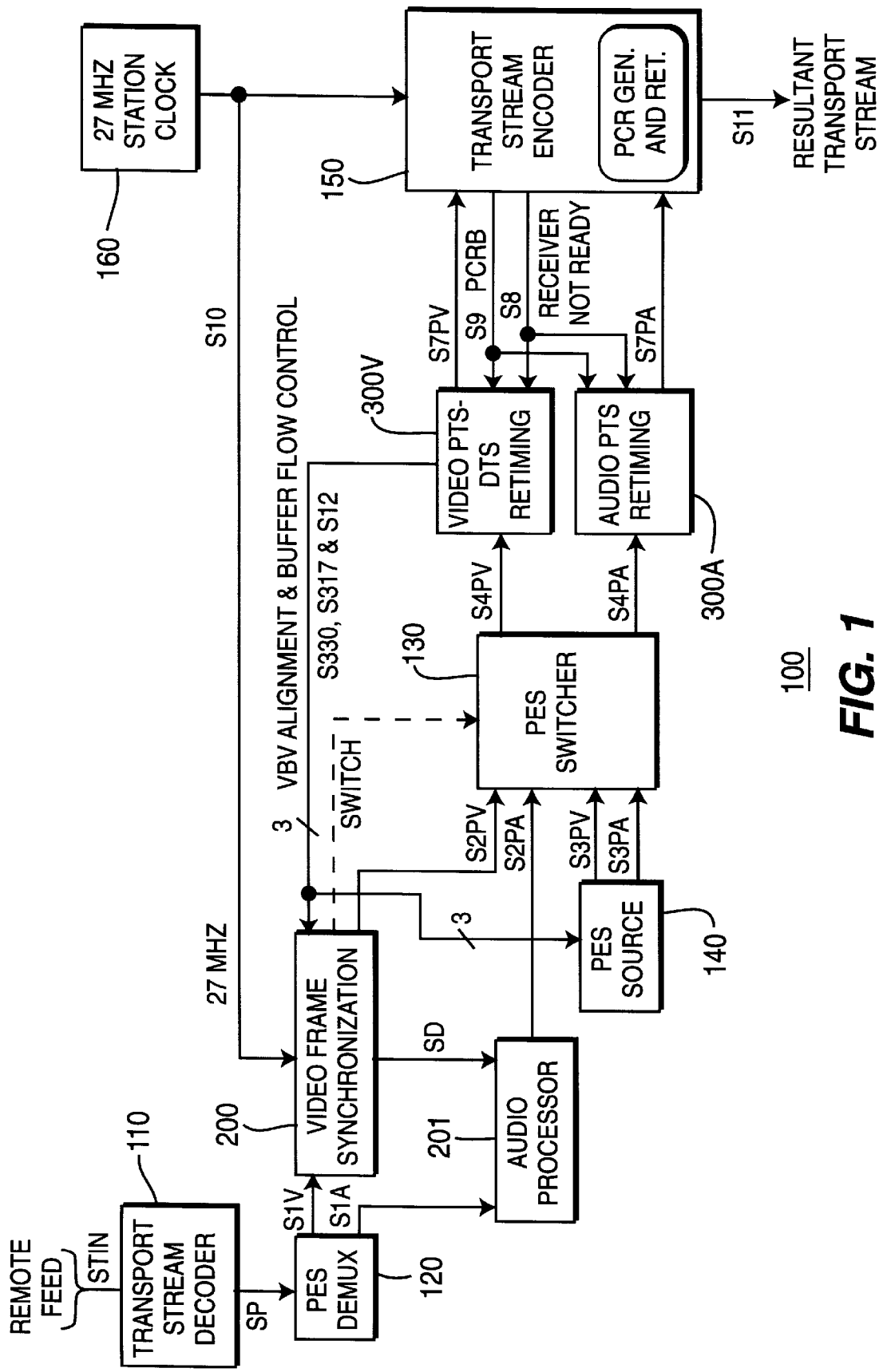
FIG. 1 shows a block diagram of an information processing system including a frame synchronizer.

More particularly, and referring now to FIG. 1, therein is illustrated a transport layer switching and retiming system 100 according to the commonly assigned '325 application. Therein, a transport stream decoder 110 decodes an input transport stream STIN that is asynchronous to a 27 Mhz studio reference signal S10 from station clock 160, illustratively a remote feed, to produce a program stream SP. The program stream SP comprises a plurality of Packetized Elementary Streams (PES). A PES demultiplexer 120 demultiplexes the program stream SP to produce the plurality of PES streams including an audio stream S1A and a video stream S1V. Those skilled in the art will recognize that PES streams are embedded within the transport packet structure, therefore the following descriptions will deal only with PES streams. The PES streams S1A, S1V include timing information such as Presentation Time Stamps (PTS) and decode time stamps (DTS) that are asynchronous with respect to the 27 MHz station clock S10. The video and audio PES streams S1V, S1A are respectively coupled to video frame synchronizer 200 and audio processor 201.

The video frame synchronizer 200 will be described more fully below with respect to FIG. 2. Briefly, the video frame synchronizer 200 operates to ensure that the received system data rate is adjusted to match the local output data rate. The frame synchronizer monitors a buffer flow control signal S12 that is indicative of buffer utilization in down stream system components, and in response thereto increases or decreases the data rate of the video frame synchronizer 200 output stream S2PV to maintain an appropriate level of buffer utilization. A decision to add or drop frames is based upon a change in the number of frames in the receiver circuitry over time. The decision to add or delete video frames is coupled as signal SD to audio processor 201 so that appropriate audio frames may be correspondingly added or deleted. The video frame synchronizer 200 and audio processor 201 produce respective frame-synchronized video S2PV and audio S2PA Packetized Elementary Streams (PES) which are coupled to a PES switcher 130. In addition to the buffer management function, the video frame synchronizer 200 aligns the video frames of a stream prior to selection of that stream by the PES switcher 130, such that the first two frames provided by the video frame synchronizer 200 are anchor frames, such as an I-frame and a P-frame.

PES switcher 130 also receives a second pair of video S3PV and audio S3PA Packetized Elementary Streams from a PES source 140 (e.g., a digital video disk player, tape player, camera, server or the like). The PES source 140 monitors the buffer flow control signal S12 that is indicative of buffer utilization in downstream system components and, in response thereto, analogously increases or decreases the data rate of the PES source 140 output streams S3PV, S3PA to maintain an appropriate level of buffer utilization.

In response to a control signal (not shown) the PES switcher 130 selects and couples one pair of video and audio Packetized Elementary Streams S4PV, S4PA to respective video and audio retiming units 300V, 300A.

Briefly, the video retiming unit 300V decodes and retimes the old Presentation Time Stamps (PTS) and decode time stamps (DTS) of the video stream using new timing information derived from a Program Clock Reference Base (PCRB) signal S9. Audio retiming unit 300A retimes the old PTS of the audio stream using new timing information derived from a Program Clock Reference Base (PCRB) signal S9. The video and audio retiming units 300V, 300A produce, respectively, a retimed video stream S7PV and a retimed audio stream S7PA. In addition, the video retiming unit 300V generates a number of control signals. The buffer flow control signal S12 is used to regulate data production in the video frame synchronizer 200 and the PES source 140. The buffer flow control signal S12 is depicted in FIG. 1 as being generated by the video PTS-DTS retiming unit 300V.

During an initialization process in the Video PTS-DTS retiming circuit 300V, the VBV delay of the VBV buffer is aligned to the VBV delay of the incoming stream. A signal S330, originating in Video PTS-DTS retiming circuit 300V indicates the VBV delay of the incoming stream is equal to the VBV delay of the VBV buffer at the end of the alignment process. The number of frames in the combined VBV buffer and the input FIFO of the video frame synchronizer 200 is stored and used to determine whether to add or drop frames. Alternately, when transport streams are being received, the PCR offset (the difference between the incoming PCR and the local PCR) can be used to determine whether to add or drop frames. The audio retiming unit 300A does not include buffer flow management functions but otherwise operates in substantially the same manner as the video retiming unit 300V, and therefore will not be discussed further. Apparatus suitable for use as the video retiming unit 300V is more fully described regarding FIG. 3.

A transport stream encoder (TSE) 150 receives the retimed video S7PV and audio S7PA PES streams and encodes these streams to produce an output transport stream S11. TSE 150 includes a PCR generator and retimer, receives the 27 MHz station clock signal S10 and performs PCR stamping of the output transport stream S11. The PCR generator also produces the synchronized PCR base reference signal S9 at a 90 Khz rate (the station clock of 27 MHz divided by 300). The PCRB reference signal S9 is fed back to the retiming units 300V, 300A for use in the PTS and DTS stamping process.

The above-described information processing system 100 may be used in a digital communication system, such as the system described in the Advanced Television Systems Committee (ATSC) digital television (DTV) standard document A/53, also incorporated herein by reference. In such a system it is often desirable to switch from a first (i.e., the currently-selected or from) video and/or audio source to a second (i.e., the next-selected or to) video and/or audio source in a smooth or "seamless" manner (i.e., minimal undesirable visual or aural artifacts).

To ensure a smooth switching between MPEG streams the following processing operations are deemed to be desirable. First, the next-selected stream should be subjected to a frame alignment process prior to switching. The frame alignment process ensures that the first frame of the next-selected stream that is coupled to the output is a non-predicted frame, i.e., an intraframe or "I-frame." The second frame should be another I-frame or a frame predicted using only the first frame, i.e., a forward predicted or "P-frame." When an I-frame is not followed by another I-frame or a frame predicted using only the first frame, i.e., a forward predicted or "P-frame," a specially coded P-frame can be added between the previously existing I-frame and B-frame series or intervening B-frames can be dropped to close the Group Of Pictures (GOP). This artificially inserts an entry point into the stream during the alignment process. The frame alignment process is performed by the frame synchronizer 200. Second, the VBV delay alignment is performed by the PTS-DTS retiming unit 300V. Alignment results are indicated on signal S330 of FIG. 1. Third, the VBV delays and the utilization of buffer memory (e.g., far-end decoder input buffer or FIFO 220) should be monitored before and after switching. After S330 indicates VBV delay alignment, an increase or decrease in the number of frames stored in the combined VBV-buffer and the input FIFO in the frame synchronizer 200 determines the need to add or drop frames.

Figure 2:
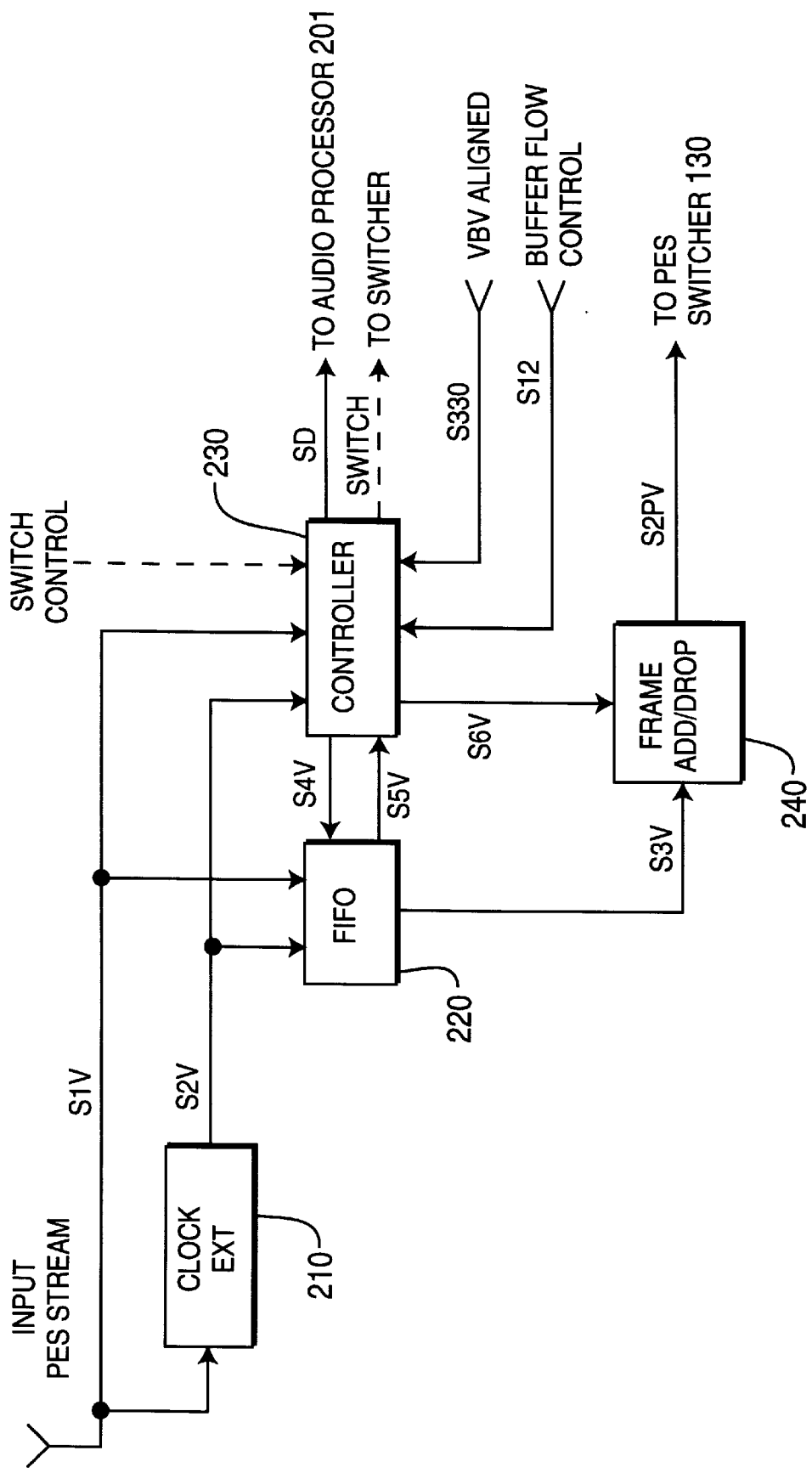
FIG. 2 shows a block diagram of a frame synchronizer suitable for use in the information processing system of FIG. 1; and, FIG. 3 shows a block diagram of a PTS-DTS retiming system suitable for use in the information processing system of FIGS. 1 and 2.

Referring now also to FIG. 2, it shows a block diagram of an illustrative frame synchronizer suitable for use in the information processing system of FIG. 1. The frame synchronizer 200 receives a Packetized Elementary Stream (PES) S1V, illustratively a video stream, aligns the received PES stream in a first operating mode (i.e., a "pre-select" mode) and couples the PES stream to an output in a second operating mode (i.e., a "selected" or "steady-state" mode). In addition, the frame synchronizer 200 performs various buffer management operations during the second operating mode. The controller 230 is optionally forced into the pre-select or selected modes of operation by a signal SWITCH CONTROL. Moreover, the controller optionally transmits a signal SWITCH to cause a switching operation to take place by a "down-stream" switcher e.g., PES switcher 130.

The input video PES stream S1V is coupled to a clock extractor 210, a first-in first out (FIFO) memory 220 and a controller 230. FIFO 220 is preferably large enough to hold an I-frame plus all subsequent frames up to and including the next I-frame. The video stream S1V is clocked into FIFO 220 using a load clock signal S2V associated with the arriving data. A FIFO output stream S3V representing the temporarily stored input video stream S1V is coupled to a frame add/drop unit 240. Add/drop unit 240 produces an output video stream S2PV comprising the FIFO output stream S3V (pass-through mode), the FIFO output stream S3V with additional frames added (frame add mode) or FIFO output stream S3V with frames deleted (frame drop mode). The mode of operation of addldrop unit 240 is controlled by a signal S6V from the controller 230. The controller 230 also monitors FIFO 220 via a monitor signal S5V and controls FIFO 220 via a control signal S4V. The controller receives a buffer flow control signal S12 that is indicative of buffer utilization in down-stream system components. The controller causes the add/drop unit 240 to add or delete video frames, thereby maintaining timing synchronization of the remote and local sources.

The controller 230 monitors the input video stream S1V and the FIFO 220. The controller also controls the operation of the FIFO 220 by causing the FIFO to discard all or portions of the stored input video stream S1V for example. For illustrative purposes it is assumed that each PES packet contains one video access unit (i.e., video frame). Before this video stream can be switched to e.g., by PES switcher 130 and become the output stream an alignment for switching purposes is made. Since the MPEG Sequence Header contains information vital to decoding the pictures, a switch into a stream preferably occurs just prior to the sequence header. The last sequence header that has entered the FIFO is stored for use when a sequence header does not immediately precede an I-frame. The FIFO is therefore flushed of all data until an I-frame sits at the output of the FIFO.

The bitstream is constrained such that I-frames are followed by P-frames or I-frames in transmission order to insure replacement of both anchor frames at switch points. When I-frames are followed by B-frames, a P-frame comprised of uncoded macroblocks with zero motion vectors may be optionally inserted between the I-frame and the B-frames or intervening B-frames can be dropped to create a closed GOP. This P-frame will act as a repeat last frame command. The visual effect of the repeat frame on video quality is masked by the scene change that occurs coincident with the switching of streams. The buffer flushing process continues each time an I-frame enters the FIFO until a decision to switch to this stream is made. If the I-frame has been immediately preceded by a sequence header, then the switching process continues using the PES and sequence headers within the PES packet. If the PES packet for the I-frame does not contain a sequence header, then the last stored sequence header is multiplexed into the stream. The resulting output stream contains a sequence header just prior to the I-frame.

At the switch point at least two frames must reside within the FIFO memory. This condition permits a calculation of the temporal reference at the switch point. Optionally, a group of pictures (GOP) header may be inserted prior to the output of the I-frame and the temporal reference of the I-frame set to zero. Offsets from the incoming temporal references and the new values are calculated at the switch point.

Using such a device and method, streams can essentially be left at any point with the consequence of the last frames in the currently-selected stream possibly being of incorrect display order. However, the visual effect will be masked by the natural shift to new video material. If the currently-selected stream is left just prior to an anchor frame, no frame reordering effect will be encountered. An additional number of frames, belonging to the currently-selected stream, reside in the decoder buffer at this time. The number of frames in the decoder buffer have been tracked by a frame byte counter in the PES retiming circuit 300V.

An MPEG picture header contains a Video Buffering Verifier (VBV) delay number indicative of the amount of time a decoder should wait (after the picture header enters the decoder's VBV buffer) before decoding the picture. The VBV delay equates to the decode time stamp (DTS) minus the program clock reference base PCRB. This equation relates to the number of frames in the decoder buffer. The VBV delay at any given instant can be calculated using this equation at the output of the PES retiming circuit 300V.

The incoming MPEG stream contains the VBV delay created when the stream was encoded or retimed. Both the next-selected stream (TO stream) and the currently-selected stream (FROM stream) VBV delays are known at the time of switching. In general these values will not match. Since during video encoding it is generally desirable to place as many frames in the decoder buffer as possible, the VBV delay of the last frame in the currently-selected stream should be large. This creates an opportunity to match the VBV delay of the next-selected stream to the actual VBV delay in the decoder buffer.

The next-selected stream and currently-selected stream VBV delays are compared in the PES retiming circuit 300V at the time of switching. This initially indicates whether the decoder buffer contains too much or too little delay. When too little delay is in the decoder buffer to satisfy the incoming VBV delay value, data should be output at a maximum rate. This places more frames of delay in the decoder buffer. This process continues until the VBV delay in the decoder buffer (i.e., VBV delay calculated in the PES retiming circuit 300V) approximates the just-selected stream (To stream) VBV delay. The number of frames in the input FIFO 220 is monitored during this process. If the FIFO 220 is nearing empty, a repeat frame is added to the stream from the repeat frame store. When too much delay is in the decoder buffer, output can be stopped until the proper amount of delay is in the decoder buffer, however it is recognized this may be unacceptable in certain circumstances where there should be a continuous and substantially non-interrupted output of data as will be discussed. If FIFO 220 is nearing overflow, a frame is dropped from the stream. When the VBV delays are aligned, output rate control switches to a second mode of operation.

The second mode of operation is controlled by the PES retiming circuit 300V. The number of frames in the input FIFO plus the number of frames in the decoder buffer, when added together and multiplied by the frame period produce the end-to-end delay of this system. The end-to-end delay of a system may also be defined as the amount of time required for any individual byte to travel from the input of the receive input FIFO to the output of the VBV buffer. This end-to-end delay value is stored for use in determining the remote source's clock timing difference from the local reference clock. The value is stored when the incoming VBV delay is aligned to the VBV delay in the decoder buffer. This end-to-end delay value is expected to remain constant when the remote and local clocks are at exactly the same rate. Alternately, the offset between the incoming PCR and the local PCR can be stored. This offset is expected to remain constant when the remote and local clocks are at exactly the same rate. The PES retiming circuit extracts frames from the FIFO based upon the frame rate embedded in the data stream. The decoder buffer contains the VBV delay currently in the stream.

The controller 230 monitors the FIFO 220 and determines if the FIFO 220 is filling (i.e., remote clock faster than station clock) or emptying (remote clock is slower than station clock). If the FIFO is tending to fill up then the controller may responsively cause the add/drop unit 240 to drop one or more frames. If the FIFO is tending to empty then the controller may responsively cause the add/drop unit 240 to add one or more frames. This filling up or emptying of the FIFO may occur in the second operating mode of the frame synchronizer, when the FIFO is briefly storing each frame of the input video stream S1V and the PES switcher 130 has selected the remote video and audio streams S2PV, S2PA for output.

Dropping frames is accomplished by choosing frames that can be safely removed from the stream without upsetting either the picture re-ordering scheme or the predicted picture quality. This may include dropping one or more frames to accomplish this end. Predicted picture quality is minimally affected when the last B-frame before an anchor frame is dropped. Any B frame may be deleted without affecting the quality of the other pictures in the stream.

Adding frames is accomplished by inserting a P- or B-type frame comprising uncoded macroblocks with zero motion vectors. Such a frame acts as a "repeat last frame" command in an MPEG-compliant syntactical manner as has been discussed. The added frame can be either a P-frame or B-frame, though a P-frame is preferred because picture quality is best preserved when the added frame causes an I-frame to be repeated. The added "dummy" frame is stored using the controller 230 or add/drop unit 240 and inserted when necessary.

Controller 230 may be used to monitor external criteria in the input PES stream S1V. Examples of external criteria which might be evaluated include scene change indicia (e.g., a large number of intra-coded macroblocks), black field indicia, a minimal number motion, and the appropriate detection of anchor frames (i.e., I-frame followed by an I-frame or a P-frame). By utilizing the external criteria, frame adding and frame dropping may be performed in a manner which minimizes the impact on video and audio quality for example.

In other words, frame synchronization is used to adjust the data flow to accommodate differences between the input and output clock frequencies or to compensate for a shortage or over abundance of frames during the splice transition period. Frame synchronization involves a decision to add or drop frames and the mechanism for doing so. The decision to add a frame is based upon the fullness of the switch input buffer over a period of time. If the clock rate for a stream being switched to is lower than the output rate, the number of frames in the input buffer will diminish over time and a repeat frame can be used to effectively add a frame to the input buffer. Conversely a drop frame will remove a frame from the input buffer that is rising in frame count. Frame dropping simply removes a frame which is preferably the first B-frame after the last anchor frame in a GOP from the indexed list of frames. A frame is added by inserting a previously encoded P or B -type frame comprising uncoded macroblocks with zero motion vectors. As set forth, such a frame acts as a repeat last frame command in an MPEG compliant system. As set forth however, this adding and dropping of frames changes the end-to end latency of the overall system though. Accordingly, the present invention introduces latency control to the decision to add or drop frames. In a preferred form, overflow and underflow prevention is a higher priority than latency control.

Preferably, a fixed number of frames is maintained in the preselected stream buffer FIFO 220. This buffer 220 may fill beyond this fixed number while waiting for an exit point thus increasing the end-to-end delay or variable latency in an undesirable manner. Further exasperating the situation, as further switches are completed this variable latency can undesirably continue to grow or be reduced depending upon the nature of the particular switch. Preferably the fixed number of frames is two or three frames, although a higher number of frames can of course be utilized.

So, after a switch from a "FROM" bitstream to a "TO" bitsteam a B-frame is extracted once a GOP for example, to return the number of frames stored in the buffer to the calculated number of frames, thereby advantageously decreasing the variable latency to an expected value associated with the fixed number of frames preferably stored. It should be recognized that the frame synchronization previously described preferably still functions to regulate decoder buffer fullness, and may actually operate to reinstall some "dummy" or repeat B-frames consistently with the method earlier discussed to insure an underflow condition is guarded against. This may result in the latency control subsequently removing a later B-frame to continue to return the number of frames stored in the FIFO 220 to the fixed number, however the action of the frame synchronizer 200 with the latency control converges to maintain a fixed latency associated with the fixed number of frames over time thereby advantageously reducing the undesirable and unpredicted variable latency to an expected value.

Figure 3:
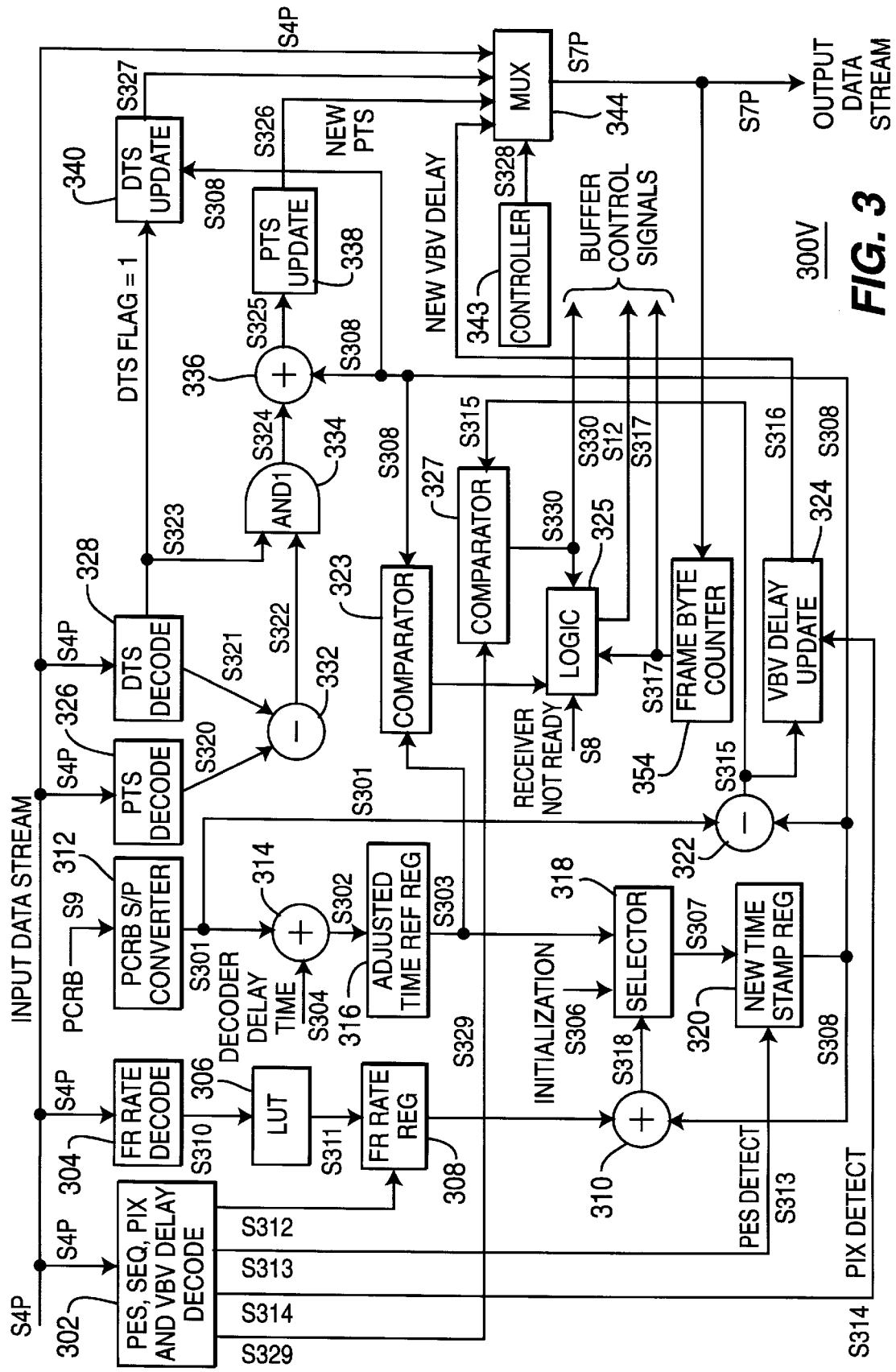

Referring now also to FIG. 3, The VBV delay is modified in the output stream to maintain buffer occupancy at the decoder. A model of a Standard Target Decoder (STD) Video Buffering Verifier is maintained as a Frame Byte Counter 354 for the output stream of the switch. This module tracks the VBV Buffer fullness and VBV_delay of the output stream using the PCRB generated by the transport stream encoder (TSE) 150. A buffer size value (vbv_buffer_size_value) is obtained from the sequence header. Each frame that leaves the TSE 150 contains a DTS that indicates the appropriate time to remove that frame from the VBV Buffer. When the PCRB equals the DTS that frame will be instantaneously removed from the STD buffer. The VBV tracking module 354 accumulates the number of bytes sent within each frame and decrements the number of bytes in a given frame when the PCRB equals DTS for that frame. This can be accomplished by tracking the local PCRB, the number of bytes in each frame, and the DTS for each frame. Tests should be conducted to insure that the STD buffer neither overflows nor underflows.

FIG. 3 shows a block diagram of a video PTS-DTS retiming system 300 suitable for use in the systems of FIGS. 1 and 2. The PTS-DTS retiming unit 300V receives a PES input bitstream S4P from a PES switcher 130 and delivers a PES output bitstream S7P to a TSE 150 in the studio or station case for example. The TSE performs the PCR stamping at its output. The TSE feeds back a synchronized PCR base reference at a 90 KHz rate (the station clock of 27 MHz divided by 300). The PTS-DTS retiming unit operates as follows.

PCRB serial to parallel converter 312 converts the PCRB signal S9 from TSE 150 into a parallel (byte) stream S301 which is coupled to an adder 314 and a subtractor 322. Adder 314 adds the parallel PCRB S301 to a decoder delay time S304 to produce an adjusted PCRB time reference S302 which is stored in an adjusted time reference register 316. The adjusted PCRB time reference S302 reflects the value of the PCRB count when a first picture may be removed from a video buffer and decoded at the far-end decoder.

The addition of a decoder delay time S304 provides a mechanism for achieving a particular video buffer fullness level in a decoder of the type which uses the DTS for buffer control. The additional delay time causes the decoder to maintain a desired level of buffer utilization, e.g., fill video buffer with a certain number of pictures (perhaps all of the pictures representing the end-to-end-delay). One or more of the following factors may be used to determine the decoder delay time S304; the header entries of the VBV buffer size, the VBV delay and frame rate, the number of bytes in a frame and the number of frames (i.e., a frame byte count) in the decoder buffer.

The method for using the delay time S304 to control the fullness of the decoder buffer is as follows. The adjusted PCRB is used as the DTS entry. When a video PES is present at the output of the video buffer at the decoder, the DTS (Decode Time Stamp) contained in the PES header is compared to the PCRB real-time clock reference derived from the PCR (Program Clock Reference) packets in the transport stream. The PES must await alignment of the DTS with the recovered PCRB. This alignment takes place after the period of time that the value of the delay time S304 indicates, because the delay time S304 was added to the PCRB at the encoder, and this adjusted PCRB is used as the DTS entry.

At a turn-on initialization time, an initialization command S306 causes a selector 318 to transfer the stored time reference S303 into a new time stamp register 320. Each time a PES header is decoded in the input bit stream S4P, an offset number, stored in the frame rate (FR) register 308, is added to the new time stamp S308 by an adder 310. The result of this addition is returned to the new time stamp register 320 via selector 318.

The adder 310 offset number is specifically the number of cycles of 90 KHz contained in one frame time of the prevailing frame rate. The adder 310 offset numbers are shown in Table 1 (third column), and are automatically set as follows. A PES, sequence, pix and VBV delay decoder 302 detects a sequence start code in the input data stream S4P and produces a sequence detect signal S312. A frame rate decoder 304 extracts the four-bit Frame Rate Code S310 (first column of Table 1). The binary value of the frame rate code S310 corresponds to the frame rates listed in the second column of Table 1, as per the ATSC specification. A Look-Up-Table (LUT) 306 provides the offset number S311 (third column of Table 1) to frame rate register 308. In response to sequence detect signal S312, frame rate register 308 provides the stored offset number to adder 310. It should be noted that since PES streams can have a plurality of sequences of intermixed frame rates, the PTS-DTS retiming unit automatically calculates all of the time stamp updates.

The next step is to calculate the new PTS and DTS. DTS decode unit 328 decodes the DTS, if present, in the input data stream S4P to produce a DTS signal S321. DTS decode unit 328 also provides an indication flag S323 which is high (binary 1) if the input data stream S4P includes a DTS, and low (binary 0) if there is only a PTS (i.e., B-Frame operation). The DTS indication signal S323 is coupled to AND unit 334 and DTS update unit 340. The new DTS S327 is taken from the new time stamp register 320 only if the DTS flag S323 indicates the presence of a DTS in the input data stream S4P.

PTS decode unit 326 decodes the PTS in the input data stream S4P to produce a PTS signal S320. The difference S322 between the existing PTS S320 and DTS S321 is provided by subtractor 332 to AND unit 334. The new PTS S326 is calculated by adding the subtractor 332 output number S322 to the number S308 stored in the new time stamp register 320. This operation takes place in adder 336. Notice that when there is no DTS present (i.e., DTS Flag=0), then the input S324 to adder 336 from AND unit 334 is zero (because of the operation of the AND unit 334) and new PTS S326 is the number S308 stored in the new time stamp register 320.

The new PTS S326 and the new DTS S327 are stored in respective update registers 338,340. A multiplex unit 344 inserts the new PTS S326 and DTS S327 values into the output data stream S7P in place of the old values. A controller 343 tracks the location of the appropriate bits in the outgoing data stream S7P, and causes the multiplex unit 344 to insert the updates in the correct positions in the stream. The outgoing data stream S7P proceeds to the transport stream encoder 150 in the usual manner.

The PTS-DTS retiming unit 300V also provides the ability to manage end-to-end delay in the system by accounting for buffer behavior in a far-end decoder (e.g., a set-top receiver) and buffer or bitstream generation behavior in the bitstream sources (e.g., encoder 210 and server 220), as will now be described.

PES, sequence, pix and VBV delay decoder 302 detects the start of a PES packet in the input data stream S4P and produces a PES detect signal S313 which is coupled to the new time stamp register 320. At each PES interval, the new time stamp register 320 is updated with a fixed constant S318 which is determined by the prevailing frame rate. The updated contents S308 of the new time stamp register 320 are compared with the contents S303 of the adjusted time reference register 316 by a comparator 323. The comparator result (i.e., less than, greater than, or equal to) provides an indication of the rate at which the PES data is being processed (i.e., too slowly, too quickly, or just right). If the PES streams S4P are being issued too slowly by, e.g., the live video encoder 210 or server 220, the encoder 210 or server 220 output buffers (not shown) may be read or emptied at a maximum rate. If the comparison indicates that processing is proceeding too quickly, the rate of reading the buffers in the encoders or servers can be reduced. A buffer control signal S12 may be used to control encoder 210 or server 220 buffer utilization.

VBV buffer fullness is monitored to properly control the flow of the video stream to the decoder. At initialization (i.e., initialization command S306 asserted), the number of bytes output from the PTS-DTS retiming unit 300V are stored on a frame by frame basis. The current time, decode time for each frame, the number of bytes per frame, and the VBV buffer size are used to determine the fullness of the VBV buffer. At initialization the VBV buffer is empty. As the first frames are output to the VBV buffer, a running total of the bytes in the VBV buffer is maintained by a frame byte counter 354. If this total equals the VBV buffer size, an output signal S317 from the frame byte counter 354 to the logic unit 325 causes the logic unit 325 to prevent data from being output from the PTS-DTS retiming unit 300V.

Two modes of VBV buffer operation are possible as described in Annex C of the MPEG2 specification. The first mode (Mode A) requires VBV delay to be set to hexadecimal FFFF. The second mode (Mode B) requires the VBV delay to not be set to hexadecimal FFFF, but instead reflect the true value of VBV delay in the VBV buffer. During Mode A initialization, bytes are output to the VBV buffer until the buffer is full as indicated by frame byte counter 354. Once the VBV buffer is full, data is extracted from the VBV buffer as described in Annex C of the MPEG2 specification which is illustrated in Table-1 hereof. During Mode B initialization, bytes are output to the VBV buffer until the calculated value of VBV delay is greater than or equal to the VBV delay value in the incoming stream S4P. The incoming stream should be self consistent and MPEG2 compliant in that the buffer will not over/under flow using the values contained in the stream. The calculated value of VBV buffer fullness contained in frame byte counter 354 is used to prevent under/over flow of the VBV buffer. Data flow to the VBV buffer can be regulated using this calculated value if the incoming stream for some reason is not consistent. The DTS-PTS values in the stream should be consistent with the VBV delay values contained in the stream.

When switching to a stream in Mode A, the hexadecimal FFFF value of VBV delay in the next-selected stream is overwritten with the calculated value maintained in the PTS-DTS retiming section. When switching to a stream in Mode B, the hex value of VBV delay in the next-selected stream is overwritten, when necessary, with the calculated value maintained in the PTS-DTS retiming section 300V until the calculated VBV buffer value and the next-selected stream VBV delay value are aligned. Otherwise the incoming stream data flow is held until the VBV delays align. This process takes advantage of the re-multiplexing operation that is occurring in the TSE that follows the retiming circuit. During the alignment period, data may be output to the VBV buffer at maximum video bit rate, to increase the VBV delay in the VBV buffer. This process can continue until the VBV delays align as long as the buffer does not become full.

A key element in implementing the present splicing technique is regulating the flow of data through the transport multiplex. The flow of video data is regulated to insure neither an overflow nor an underflow of the VBV buffer, and the STD Video Buffer Verifier Delay (VBV_delay) values in the output stream are maintained at levels consistent with the relationship between Program Clock Reference (PCR) and Decode Time Stamp (DTS) while neither over- nor under-flowing the VBV Buffer.

The objective of flow control is to re-align the delay associated with the VBV buffer (vbv_delay) with the vbv_delay in the incoming stream during the transition period that follows a stream splice. If the actual vbv_delay, as indicated by the STD Video Buffering Verifier module 354 is larger than the incoming stream vbv_delay, the video flow to the output can be slowed until the vbv_delays match as opposed to stopping the flow of data as has been previously discussed. When the actual vbv_delay is smaller than the incoming vbv_delay, the flow control operates to output the video faster than originally planned by the incoming stream. Again though, STD buffer fullness levels are still tested to prevent buffer overflow or underflow as has been discussed.

The flow rate is calculated on a frame by frame basis to assure video data is output at a rate commensurate with the original stream. The vbv_delay of the first frame after the splice is set to the actual vbv_delay being tracked by the STD video buffer verifier module. The vbv_delay of the next frame in the input buffer becomes the target value for vbv_delay. The flow rate is calculated by dividing the number of bytes in the first frame by a time interval. The time interval is the actual vbv_delay minus the target vbv_delay plus a frame rate factor all expressed in seconds. The frame rate factor is found from a lookup table based upon sequence header values for progressive and low delay as shown in Appendix C of 13818-1 MPEG Systems Specifications and as is identified by Table 1.

TABLE 1

| FRAME RATE CODE IN SEQUENCE HEADER | FRAME RATE VALUE (Hz) | ADDER 310 OFFSET NUMBER |
|---|---|---|
| 0001 | 24/1.001 (23.967 . . .) | 3753.75 |
| 0010 | 24 | 3750 |
| 0011 | 25 | 3600 |
| 0100 | 30/1.001 (29.97 . . .) | 3003 |
| 0101 | 30 | 3000 |
| 0110 | 50 | 1800 |
| 0111 | 60/1.001 (59.94 . . .) | 1501.5 |
| 1000 | 60 | 1500 |

Once the flow rate is known, actual flow control is preferably performed at the packet rate to keep computational complexity to a minimum. The time interval, TI, available to send a frame of data to a decoder buffer can be represented by:

$$TI = T(n) - T(n+1) + FP \qquad (1)$$

where T(n) is the proper vbv_delay in seconds for frame n, T (n+1) is the proper vbv_delay in seconds for a frame n+1 immediately succeeding frame n, and FP is the period of time between successive examinations of the vbv buffer as detailed in Annex C of the MPEG specification. The maximum rate that bytes can leave the flow control buffer equals the maximum transport stream rate minus the rate of audio and system data (including program specific data rate)

$$Rmax = \text{Transport Byte Rate} - \text{AUDIOrate} - \text{SYSTEMrate} \qquad (2)$$

$$d = \text{\# bytes in next frame in the Flow Control Buffer} \qquad (3)$$

$$Rflow = d/TI \quad (4)$$

$$\text{if } TI <= 0, \text{ then } Rflow = Rmax \quad (5)$$

$$\text{if } Rflow >= Rmax, \text{ then } Rflow = Rmax \quad (6)$$

It should also be understood that considering that the disclosed splicer parses TO and FROM bitstreams, it is entirely possible to convert a Constant Bitrate (CBR) bitstream to a Variable Bitrate (VBR) bitstream by detecting the padding and stuffing needed to create a CBR. Removing the padded bytes gets rid of unwanted overhead, and makes room for revenue producing opportunistic data insertion in the remultiplexing.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. In a compressed domain digital communications system, a method for reducing a variable latency associated with a buffer and at least partially resulting from at least one splice between a FROM bitstream and a TO bitstream each including data corresponding to a plurality of frames, the method comprising:

temporarily storing a portion of said TO bitstream data in a buffer;

determining a value associated with said buffered data and being indicative of said variable latency;

regulating a flow of data in the system to reduce the variable latency when the determined value corresponds to a number of frames greater than a given number of frames by selectively deleting a portion of said buffered data corresponding to a select at least one of the frames from the buffer; and, regulating a flow of data in the system to prevent an underflow condition in the system by effecting a repeat last frame command using said buffered data and prevent an overflow condition in the system by slowing a rate of transmission for at least a portion of the data associated with at least one of the frames in the TO bitstream while maintaining a substantially noninterrupted flow of data in said system.

2. The method of claim 1, wherein each select frame is selected so as not to significantly effect visual play-out of the TO bitstream.

3. The method of claim 1, wherein the system is ATSC digital television standard compliant and each select frame is a B-frame.

4. The method of claim 3, wherein each select B-frame respectively corresponds to a distinct group of pictures.

5. The method of claim 1, wherein the regulating effectively reinserts a select frame deleted.

6. The method of claim 1, wherein the system is an ATSC digital television standard compliant system and the step of effecting a repeat last frame command comprises inserting a previously encoded P or B-type frame including uncoded macroblocks with zero motion vectors.

7. The method of claim 1, wherein said slowing said rate of transmission for at least one of the frames comprises calculating a flow rate on a frame by frame basis.

8. The method of claim 7, wherein said calculating a flow rate on a frame by frame basis comprises:

determining a time interval in which to transmit at least one of the frames; and, utilizing said time interval to determine said flow rate.

9. The method of claim 8, wherein each said time interval is defined as T(n)−T(n+1)+FP, where T(n) is indicative of a time associated with a frame n, t(n+1) is a time associated with a frame n+1, frame n+1 immediately follows frame n in said TO bitstream and FP is a period of time between successive examinations of said buffer.

10. The method of claim 1, further comprising:

identifying portions of said data in said TO or FROM bitstream associated with stuffing or padding data; and, substituting opportunistic data for said identified data.

11. The method of claim 10, wherein said opportunistic data is indicative of additional information transmitted in said system.

12. A transport layer switching system suitable for use in a compressed domain digital communications system subject to experiencing a variable end-to-end delay at least partially resulting from at least one splice between a FROM bitstream and a TO bitstream each respectively including data corresponding to a plurality of frames, said transport layer switching system comprising:

a first buffer for storing a portion of said TO bitstream data being indicative of said end-to-end delay; and, a controller coupled to said first buffer, wherein said controller is responsive to an increase in said end-to-end delay by removing data associated with at least one select frame from said first buffer, to a possible overflow condition associated with a second buffer downstream from said switching system by reducing a rate of transmission for a portion of said data associated with at least one of said frames, and to a possible underflow condition associated with said second buffer by effecting a repeat last frame command using said first buffer.

13. The system of claim 12, wherein the communications system is ATSC digital television standard compliant and each select frame is a B-frame.

14. The system of claim 13, wherein each select B-frame corresponds to a distinct group of pictures.

15. The system of claim 12, wherein the communications system is an ATSC digital television standard compliant system and the step of effecting a repeat last frame command comprises inserting a previously encoded P- or B-type frame including uncoded macroblocks with zero motion vectors.

16. The system of claim 12, wherein said reducing said rate of transmission for at least one of the frames comprises calculating a flow rate on a frame by frame basis.

17. The system of claim 16, wherein said calculating a flow rate on a frame by frame basis comprises:

determining a time interval in which to transmit said data associated with one of the frames, respectively; and, utilizing said time interval to determine a flow rate.

18. The system of claim 17, wherein said time interval is defined as T(n)−T(n+1)+FP, where T(n) is indicative of a time associated with a frame n, t(n+1) is a time associated with a frame n+1, frame n+1 immediately follows frame n in said TO bitstream and FP is a period of time between successive examinations of said buffer.

19. The system of claim 12, further comprising:

identifying portions of said data in said to or FROM bitstream associated with stuffing or padding data; and, substituting opportunistic data for said identified data.

20. A method for switching from a first bitstream to a second bitstream both including data, in a compressed domain digital television transmission system, the method comprising:

identifying an entry point in said second bitstream;

buffering said second bitstream data dependently upon said identified entry point, said buffered data corresponding to a number of video frames;

determining if said number of video frames exceeds a given number, and if so removing a portion of said buffered data corresponding to at least a select one of said frames;

determining whether said buffered data is likely to cause an overflow condition in a downstream buffer when transmitted to said downstream buffer, and if so slowing a rate of transmission associated with a portion of said buffered data corresponding to at least one of said frames while ensuring a substantially non-interrupted flow of data in said system to said downstream buffer; and, determining whether said buffered data is likely to cause an underflow condition in said downstream buffer when transmitted to said downstream buffer, and if so effectuating a repeat frame command dependent upon at least a portion of said buffered data.

* * * * *